United States Patent
Rohner

Patent Number: 5,988,874
Date of Patent: Nov. 23, 1999

[54] BLACK BODY REFERENCE FOR RTA

[75] Inventor: Don R. Rohner, Austin, Tex.

[73] Assignee: Advanced Micro Devices, Inc., Sunnyvale, Calif.

[21] Appl. No.: 08/924,177

[22] Filed: Sep. 5, 1997

[51] Int. Cl.$^6$ .............................. G01K 15/00; G01J 5/02
[52] U.S. Cl. .................... 374/2; 374/2; 374/129; 250/252.1; 356/43
[58] Field of Search .................. 374/1, 2, 121, 374/126, 129; 250/252.1; 338.3; 356/43, 46

[56] References Cited

U.S. PATENT DOCUMENTS

| | | | |
|---|---|---|---|
| 3,383,902 | 5/1968 | Cragin et al. | 374/2 |
| 4,433,924 | 2/1984 | Quinn, III | 374/129 |
| 4,885,463 | 12/1989 | Wellman et al. | 250/252.1 |
| 4,919,542 | 4/1990 | Nulman et al. | 374/126 |
| 4,969,748 | 11/1994 | Crowley et al. | 374/2 |
| 4,984,903 | 1/1991 | Sweeney | 374/129 |
| 5,154,512 | 10/1992 | Schietinger et al. | 374/129 |
| 5,325,171 | 6/1994 | Shimizu | 250/252.1 |
| 5,343,040 | 8/1994 | Wiese et al. | 250/252.1 |
| 5,466,943 | 11/1995 | Green et al. | 250/338.1 |
| 5,505,543 | 4/1996 | Webbeking et al. | 374/129 |
| 5,553,939 | 9/1996 | Dilhac et al. | 374/2 |
| 5,613,777 | 3/1997 | Ridley et al. | 356/43 |
| 5,624,590 | 4/1997 | Fiory | 374/126 |

OTHER PUBLICATIONS

International Search Report for PCT/US 98/06830 dated Jun. 18, 1998.

XP–002067154 Richmond, J., et al, "An Approach to Thermal Emittance Standards," National Bureau of Standards, Washington, D.C., Nov. 1971, pp. 56–403 through 76–423 (11 double sided sheets).

Primary Examiner—G. Bradley Bennett
Attorney, Agent, or Firm—Kevin L. Daffer; Conley, Rose & Tayon

[57] ABSTRACT

A method for calibrating an optical pyrometer to an external reference point. By changing the focus of the optical pyrometer without physically moving the pyrometer, calibration of the optical pyrometer can be accomplished without modifying the semiconductor operation. Broadly speaking, the present invention contemplates an apparatus for calibrating an optical pyrometer. The apparatus includes a first optical source in a heating chamber with an optical port, an optical pyrometer, a mirror, and a second optical source. The optical pyrometer is positioned to receive light rays from a first optical source residing inside the heating chamber. The second optical source is located external to the heating chamber. The second optical source serves as an external reference point. The external location of the second optical source allows for calibration of the optical pyrometer without modification of the heating chamber or the first optical source residing inside the heating chamber. The mirror is positioned between the heating chamber and the optical pyrometer. The mirror is situated in such a way as to permit the optical pyrometer to receive light rays from the second optical source.

20 Claims, 2 Drawing Sheets

BLACK BODY REFERENCE FOR RTA

BACKGROUND OF THE INVENTION

1. Field of the Invention

The invention described hereinbelow relates to the field of semiconductor processing, and more specifically to a device and method for calibrating an optical pyrometer to an external blackbody reference point.

2. Description of the Relevant Art

Temperature is a critical variable in many semiconductor processing operations. Thermal annealing of wafers is an example of a high temperature semiconductor processing operation for which precision temperature measurements are important. A thermal anneal step is required after ion implantation in order to diffuse and activate the implanted ions and repair possible implant damage to the crystal structure of the semiconductor substrate. An anneal can occur in furnace or a more modern rapid thermal anneal ("RTA") chamber. A typical RTA process is performed at 420–1200° C. and lasts anywhere from a few seconds to a few minutes.

One of the major problems with RTA's is the difficulty in establishing the temperature of the RTA, and more specifically, the temperature at the surface of the wafer. Accurate temperature measurement is the most important and limiting factor in current RTA systems. In order to avoid contamination of wafers being processed inside the RTA chamber, preferred temperature measurements are made without physically contacting the wafers or the processing environment inside the RTA.

Radiation pyrometers are a general class of temperature measurement devices which provide the benefit of not having to touch the material being measured. Most pyrometers work by measuring radiation from the object whose temperature is to be measured. Optical pyrometers, which are often used in conjunction with RTAs, measure the temperature of incandescent bodies, such as heated wafers, by comparing them visually with a calibrated incandescent filament that can be adjusted in temperature. By running a current through a filament in the optical pyrometer, the filament begins to emit light, i.e. it becomes incandescent. The light emitted by the filament is characteristic of the temperature of the filament. An optical port built into the wall of the RTA chamber allows light from the heated wafer to be received by the optical pyrometer and visually compared to the color of the calibrated incandescent filament. The temperature of the heated wafer is established when the filament disappears against the background light of the incandescing wafer.

One of the problems with using optical pyrometers to measure the temperature of wafers in RTA chambers is the unreliability of optical pyrometers over long periods of time. As the number of measurements increases the accuracy of the optical pyrometer decreases. Deviations on the order of 10 degrees centigrade are possible in standard RTA processes.

One common method for calibrating optical pyrometers used in RTA processes involves placing a test wafer into the RTA chamber. A suitable test wafer in most cases will be a wafer with a reference thermocouple attached. The temperature value measured with the optical pyrometer is compared to the temperature value measured with the thermocouple. Reliable thermocouples are readily available in the market, and services such as the National Institute of Standards and Technology and the National Bureau of Standards provide calibration of thermocouples. Thus, thermocouples generally provide reliable reference temperatures.

However, in the case of RTA processes a number of problems are associated with this method of calibration. First, placement of the thermocouple into the RTA chamber creates a potential source of contamination which may result in an inaccurate temperature reading. A second problem is an increase in manufacturing costs resulting from downtime on the RTA when the test wafer is inserted and the testing process is carried out. As to the first problem, one possible source of contamination arises because the thermocouple must be electrically connected to a signal processing device outside of the RTA chamber. Another source of contamination is the solder used to attach the thermocouple to the wafer. At least one invention has contemplated a method of calibrating an optical pyrometer that circumvents the potential contamination problems that may accompany using a reference thermocouple fixed on a wafer.

In Dilhac et al. (U.S. Pat. No. 5,553,939), a test wafer with a reference region having an electromagnetic wave reflection discontinuity at a known temperature value is used. The advantage of this method is that the reflection discontinuity region does not present a potential source of contamination. Additionally, the reference discontinuity region can be put on the surface of the wafer opposite to where the optical pyrometer will be aimed. In this way, the light reflected from the reference region will not interfere with the pyrometer reading. While Dilhac et al. presents one way to overcome the contamination problem, it does not solve the second problem of higher costs due to RTA downtime.

Another conventional method of calibrating optical pyrometers is with blackbody calibration furnaces. Technically a blackbody is a surface that absorbs as much radiation as it emits, and the nature of the emitted radiation can be fully characterized by the temperature of the surface. All blackbodies have the same relationship between intensity or spectral radiance (which is what the optical pyrometer measures) and the wavelength of the light emitted by the blackbody. Because the emitted radiation does not depend on the size of the blackbody, relatively small but effective blackbodies are obtainable. The limiting factor on size becomes the dimensions of the heating chamber which is required to maintain the temperture at the surface of the blackbody. While blackbody references are conventional, either the optical pyrometer or the blackbody reference must be physically moved to allow calibration. In the case of an optical pyrometer fixed to an RTA chamber these options are not available. Thus, in addition to avoiding modification of the RTA process, it would be advantageous to provide a means for calibrating an optical pyrometer that does not require physical movement of either the pyrometer or the reference.

SUMMARY OF THE INVENTION

The problems identified above are in large measure addressed by a method for calibrating an optical pyrometer to an external reference point. For example, the external reference point may be a blackbody reference or the apparatus in Dilhac et al. It is theorized that a mirror may be used to change the source of the light being received by an optical pyrometer utilized in a semiconductor processing operation. By changing the focus of the optical pyrometer without physically moving the pyrometer, calibration of the optical pyrometer can be accomplished without modifying the semiconductor operation. Thus, in an RTA process, costly downtime can be eliminated.

Broadly speaking, the present invention contemplates an apparatus for calibrating an optical pyrometer. Such an apparatus includes a first optical source in a heating chamber with an optical port, an optical pyrometer, a mirror, and a second optical source. These components are arranged as follows: The optical pyrometer is positioned to receive light rays from a first optical source residing inside the heating chamber. The second optical source is located external to the heating chamber. The second optical source serves as an external reference point. The external location of the second optical source allows for calibration of the optical pyrometer without modification of the heating chamber or the first optical source residing inside the heating chamber. The mirror is positioned between the heating chamber and the optical pyrometer. The mirror is situated in such a way as to permit the optical pyrometer to receive light rays from the second optical source.

Preferably, the heating chamber is an RTA chamber and the first optical source is a semiconductor wafer being processed in the RTA chamber. In a preferred embodiment, the second optical source is a blackbody reference. A suitable blackbody reference includes at least one black body chamber with a blackbody target residing therein. More than one blackbody chamber and enclosed blackbody target may be advantageously utilized to span the operational temperature range of the RTA chamber. Ideally, the composition of the optical port in the black body chamber is identical to the composition of the optical port in the heating chamber.

According to one embodiment, the black body chamber is an oven with an optical port and the blackbody target comprises a second wafer with an attached thermocouple. The thermocouple allows the blackbody target to be calibrated periodically, where the period between calibrations is greater than the period between calibrations required to ensure accuracy of an optical pyrometer. In another embodiment, the second optical source comprises a second wafer with a reference region on one surface having an electromagnetic wave reflection discontinuity at a known temperature value.

The present invention further contemplates a method for calibrating an optical pyrometer. Given a heating chamber, an optical pyrometer is used to measure the temperature of a first optical source housed in the heating chamber. Measuring the temperature of the first optical source is accomplished by positioning the optical pyrometer to receive light rays through an optical port built into the heating chamber from the first optical source residing inside the heating chamber. In order to be sure of a correct temperature measurement, the optical pyrometer must be calibrated. To calibrate the optical pyrometer without altering or modifying the environment of the first optical source, a mirror is situated between the optical pyrometer and the heating chamber. The position of the mirror may then be adjusted so that the optical pyrometer receives light rays from a second optical source located outside the heating chamber. By switching the target of the optical pyrometer with a mirror, the optical pyrometer can calibrated to an external optical source, i.e., the second optical source.

Calibration of the optical pyrometer to the second optical source requires raising the second optical source to a first temperature. A second temperature of the second optical source is measured and recorded with the optical pyrometer using the light rays from the second optical source. The optical pyrometer is then tuned or calibrated by bringing the second temperature into coincidence with the first.

In a preferred embodiment the heating chamber is an RTA chamber, and the optical pyrometer is mounted to the RTA chamber. The first optical source is preferably a first semiconductor wafer undergoing one or more processing steps inside the RTA chamber. The position of the mounted optical pyrometer is fixed outside an optical port built into the RTA chamber. Locating the optical pyrometer opposite the optical port of the RTA chamber allows the pyrometer to receive light emanating from the wafer being processed in the RTA chamber. Placement of a mirror between the optical pyrometer and the optical port allows the optical pyrometer to be referenced to a second optical source. The second optical source is preferably a blackbody reference comprising at least one blackbody chamber housing a blackbody target. The blackbody chamber comprises an oven with an optical port and the blackbody target comprises a second wafer with an attached thermocouple. For purposes of calibrating the optical pyrometer, it is advantageous that composition of the optical port of the black body chamber be similar or identical to the composition of the optical port in the RTA chamber. In another embodiment, the second optical source comprises a second wafer with a reference region on one surface having an electromagnetic wave reflection discontinuity at a known temperature value. By referencing the optical pyrometer to an external source, modification of the processing environment inside the RTA chamber may be avoided.

BRIEF DESCRIPTION OF THE DRAWINGS

Other objects and advantages of the invention will become apparent upon reading the following detailed description and upon reference to the accompanying drawing in which.

Figure 1:
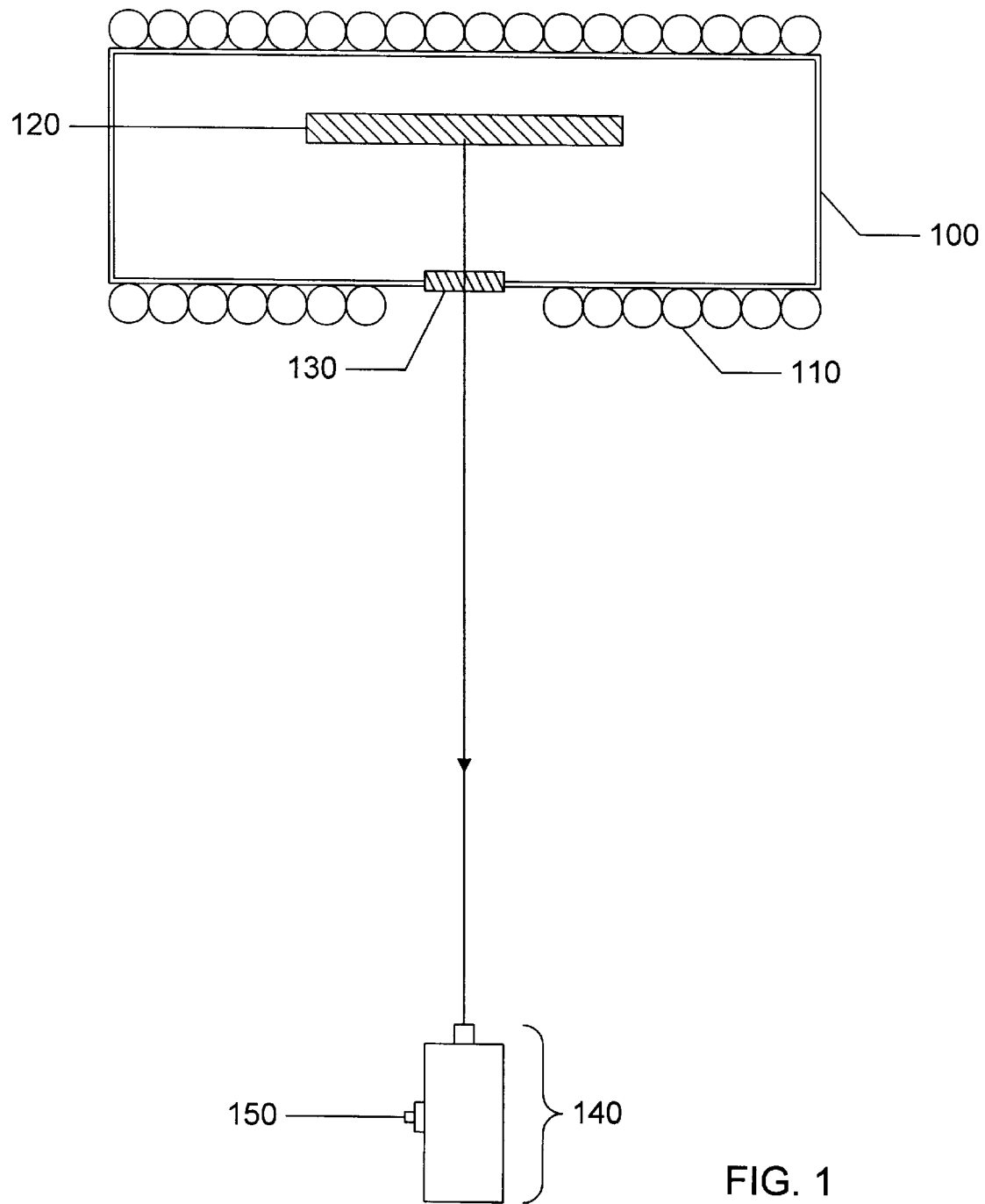
FIG. 1 is a cross-sectional schematic of wafer undergoing a semiconductor process in a heating chamber and an optical pyrometer being used to measure the temperature of the process.

While the invention is susceptible to various modifications and alternative forms, specific embodiments thereof are shown by way of example in the drawings and will herein be described below in detail. It should be understood, however, that the drawings and detailed description thereto are note intended to limit the invention to the particular form disclosed, but on the contrary, the intention is to cover all modification, equivalents, and alternatives falling within the spirit and scope of the present invention as defined by the appended claims.

DETAILED DESCRIPTION OF THE PREFERRED EMBODIMENTS

Figure 2:
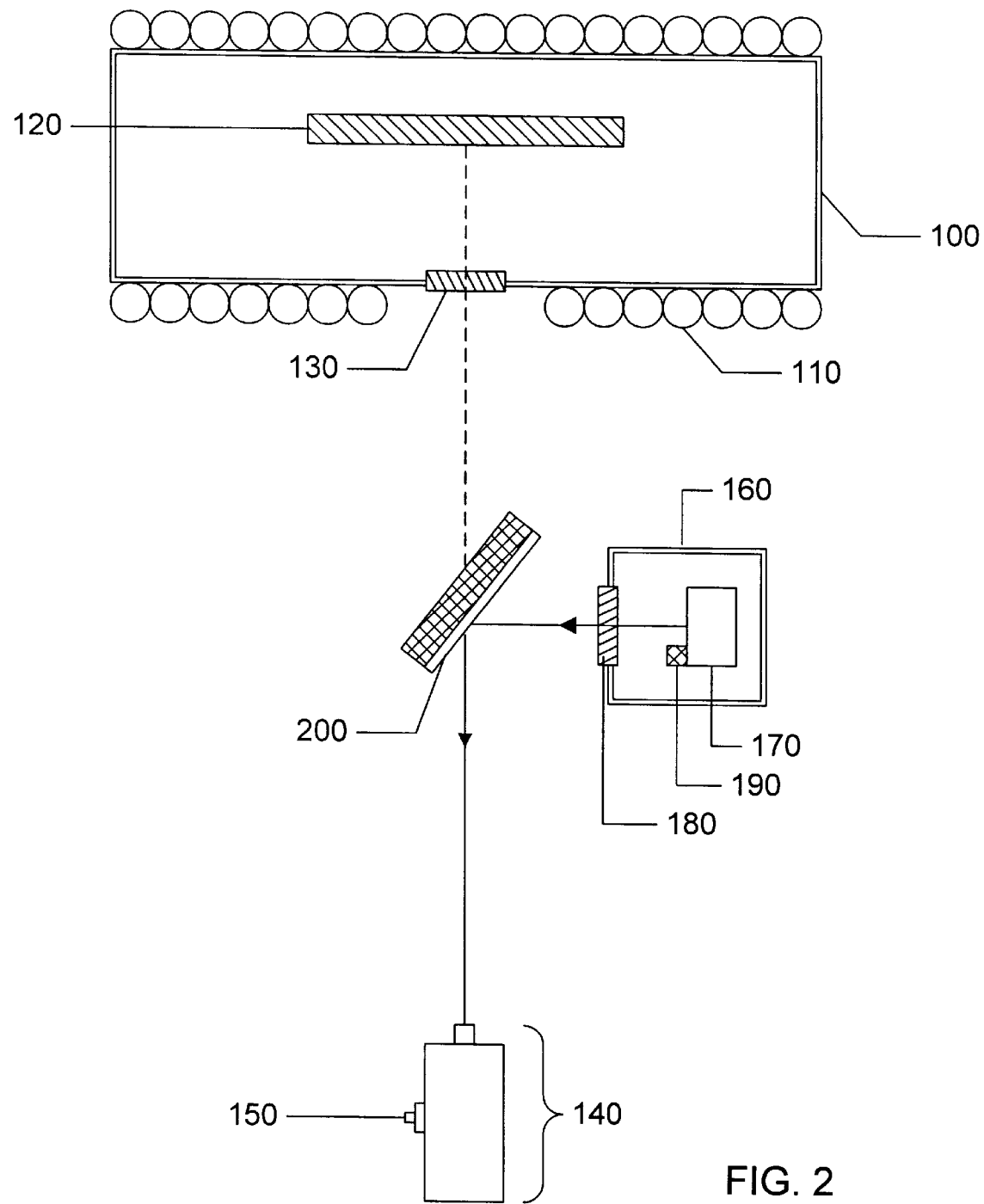
FIG. 2 illustrates a mirror being used to reference an optical pyrometer to an external reference source.

FIGS. 1 and 2 will be used to describe the invention. FIG. 1 shows a cross-sectional view of heating chamber 100. Heating chamber 100 generally represents any furnace which utilizes an optical pyrometer for temperature measurements. However, heating chamber 100 is preferably a rapid thermal anneal ("RTA") chamber.

An RTA chamber may be used to perform a thermal anneal step in a semiconductor processing operation. A thermal anneal step is required after ion implantation in order to diffuse and activate the implanted ions and repair possible implant damage to the crystal structure of the semiconductor substrate. A typical RTA process is performed at 420–1200° C. and lasts anywhere from a few seconds to a few minutes. Large area incoherent energy sources were developed to ensure uniform heating of the wafers and to avoid warping. In an RTA, these sources emit radiant light which allows very rapid and uniform heating and cooling. An array of heating elements 110 is illustrated in FIG. 1. In the case of an RTA chamber, heating elements 110 can include arc lamps, tungsten-halogen lamps, and resistively-heated slotted graphite sheets.

Wafer 120 is shown undergoing a thermal process, preferably an RTA process, in heating chamber 100. During an RTA process, wafers are thermally isolated so that radiant (not conductive) heating and cooling is dominant. Most heating is performed in inert atmospheres (argon or nitrogen) or in a vacuum, although oxygen or ammonia may be introduced into the RTA chamber for growth of silicon dioxide or silicon nitride. When wafer 120 is heated to high temperatures it will emit radiation in the optical spectrum. Some of the light rays emitted by wafer 120 will pass through optical port 130.

As shown in FIG. 1, optical pyrometer 140 is positioned to receive light rays emitted by wafer 120 that pass through optical port 130. Optical pyrometer 140 is equipped with a tuner 150, which can be used to adjust the measured value of temperature. In a typical RTA chamber, the optical pyrometer is fixed to the RTA chamber. With the optical pyrometer mounted to the RTA chamber, conventional calibration methods entail placing thermocouples attached to wafers into the RTA chamber. While calibration of optical pyrometer 140 can be carried out in this fashion, the conventional method requires modification of the RTA process. Modification of the RTA process can lead to both increases in manufacturing costs and potentially inaccurate calibration of the optical pyrometer. Miscalibration of the optical pyrometer can in turn result in lower yields of quality wafers.

Turning now to FIG. 2, a device is illustrated which attempts to reference the optical pyrometer to an external optical source which is preferably a blackbody reference point. By calibrating the optical pyrometer to a reference external to the RTA chamber, modification or interruption of processes ongoing in the RTA chamber can be totally avoided. This increases the efficiency of the RTA in two ways. First, the RTA can be operated without shutting it down to insert a test wafer with a thermocouple. Because of the delays in RTA operations that result from conventional calibration techniques, calibration of the pyrometer is only undertaken about once per month. Second, RTA processes are highly temperature sensitive, meaning that relatively minor temperature fluctuations can result in defective wafers. Optical pyrometers are not trustworthy over extended periods of time without maintenance. Thus, waiting up to a month between calibrations may lead to the production of low quality wafers.

An appropriate blackbody reference comprises a blackbody target within a blackbody chamber. Blackbody chamber 160 which encloses blackbody target 170 is shown located external to heating chamber 100. A review of blackbody physics will be helpful in understanding this aspect of the invention. All material objects absorb and emit radiation when heated. An ideal blackbody is a surface that absorbs all electromagnetic radiation incident on it, reflecting nothing. Also, an ideal blackbody emits and absorbs radiation at the same rate.

While an ideal blackbody surface is not attainable, models which closely approximate blackbodies can be found. The best example, and one that has long been used to simulate blackbodies experimentally, is the blackbody cavity. A blackbody cavity is an opaque cavity enclosed in a heat reservoir. The cavity is in thermal equilibrium with the blackbody chamber, with the result that the cavity is filled with blackbody radiation characteristic of the temperature of the cavity walls. If a small aperture is formed in the wall, the radiation which passes out the aperture very closely approximates the radiation of a an ideal blackbody, because the spectral radiance of the aperture is equal to that of the inner wall of the blackbody cavity directly opposite the aperture. Additionally, the spectral radiance depends on the temperature of the cavity and the wavelength of the light but is independent of the size of the blackbody cavity. These features make blackbody cavities excellent temperature references.

Thus, according to a preferred embodiment, blackbody chamber 160 is a heat reservoir and blackbody target 170 is a blackbody cavity with a small aperture in a wall facing optical port 180. A suitable blackbody cavity can be found that is referenced to the range of operable temperatures of the RTA. The temperature of the blackbody cavity can be set and measured by using thermocouple 190.

While blackbody cavities closely approximate ideal blackbodies, other candidates for blackbodies exist. All materials emit thermal radiation, although less than a blackbody at the same temperature. Opaque materials in thermal equilibrium with their surroundings can be viewed as be filled with blackbody radiation that is continually being absorbed and re-emitted. For example, a non-reflective black surface approximates a blackbody. Thus, blackbody target 170 may be a solid material. In one embodiment of the present invention blackbody target 170 is a semiconductor wafer. Although further away from an ideal blackbody target, a second wafer with the same composition as the wafer being processed in RTA chamber 100 provides some advantages. The availability of appropriate second wafers is one factor. Also, a wafer which had previously been used in a conventional calibration process may be utilized in the present method. Additionally, with a wafer being used as a blackbody target, the blackbody reference actually represents a model of the process being monitored. In this case it becomes important that the composition of optical port 180 match the composition of optical port 130 built into the heating chamber.

More than one blackbody chamber and enclosed blackbody target may be advantageously utilized to span the operational temperature range of the RTA chamber. A plurality of blackbody references may be required where the temperature range of a process extends beyond the limit of a single blackbody source. In such a case, a single fixed reference cite may be assigned, and the individual blackbody sources may be interchanged. Another option is to arrange the plurality of blackbody references about the optical pyrometer and use mirror 200 to target the appropriate blackbody reference for a particular temperature range.

Blackbody references do not provide the sole class of external references for calibrating optical pyrometer 140, although they are the preferred references. One example of a reference which may be used in the place of a blackbody reference is a test wafer with a reference region having an electromagnetic wave reflection discontinuity at a known temperature. This is the invention contemplated in Dilhac et al. (U.S. Pat. No. 5,593,939).

With an appropriate external blackbody reference in place, mirror 200 may be situated between RTA chamber 100 and optical pyrometer 140. Mirror 200 provides the means for targeting the external reference source. By placing mirror 200 between RTA chamber 100 and optical pyrometer 140, light rays from wafer 120 are prevented from reaching optical pyrometer 140. Subsequent adjustment of mirror 200 can bring the external reference source into view of optical pyrometer 140. Mirror 200 is preferably fully reflective, but a partially reflective and partially transmissive mirror is possible.

The appropriate positioning of mirror 200 between RTA chamber 100 and optical pyrometer 140 may be accomplished in a variety of ways. For example, mirror 200 may be manually moved into position. Manual positioning may entail building a permanent or temporary frame for holding the mirror in place. Although manual positioning is a possibility, automatic positioning is preferred. Automatic activation of mirror 200 can be accomplished through well known means. For example, mirror 200 may be mounted onto a frame with a motor attached which can rotate mirror 200 into and out of position when calibration is needed. Whether automatic or manual means are used for the first positioning of mirror 200, the important factor is that mirror 200 be in position when calibration is desired and out of position when optical pyrometer is engaged in temperature measurements of processes occurring in RTA chamber 100.

Once mirror 200 is located between RTA chamber 100 and optical pyrometer 140, further adjustment of mirror 200 is required in order to allow light rays leaving blackbody target 170 and passing through optical port 180 to reach optical pyrometer 140. Proper alignment of blackbody target 170 and optical pyrometer 140 may be accomplished by using a laser light source. In FIG. 2, the location of blackbody chamber 160 is shown such that the path of light rays leaving blackbody target 170 and the path of light rays leaving wafer 120 intersect at a right angle. However, in an actual design the positioning of the external reference will be dictated by the geometry of the RTA and its physical environment.

In order to reference optical pyrometer 140 to the external reference source, two temperature values are required. When the external reference source is a blackbody reference that has been previously calibrated the first temperature value may be obtained by simply setting a temperature control gauge located on blackbody chamber 100. When needed, calibration of blackbody target 170 can be achieved by measuring the temperature of thermocouple 190 and reference to a known physical temperature standard. For temperatures up to 1000° C., the temperature of the blackbody may be measured using a platinum/platinum-rhodium (13 percent) thermocouple and ice point reference. For higher temperature calibrations of a blackbody the melting point of a metal such as gold may be used as the physical standard. In any case, the issue with calibrating the blackbody reference is confidence that the actual temperature of blackbody target 170 rises to the set temperature.

In the case where the blackbody reference has not been tuned prior to use in calibrating optical pyrometer 140, the first temperature value must be measured contemporaneous to a subsequent temperature measurement made with the optical pyrometer. In an embodiment where blackbody target 170 is a semiconductor wafer, the first temperature of the semiconductor wafer residing in blackbody chamber 160 is made with thermocouple 190. A key to this procedure is the understanding that the thermocouple is attached to the appropriate blackbody target in close proximity to where the optical pyrometer will view. In this manner, the temperature delta between the thermocouple attachment point and the point at which the pyrometer views is small. Therefore, calibration can be kept within a small margin of error as compared to the 5 to 10 degree centigrade variation now being experienced.

With a first temperature measurement of blackbody target 170 having been made and recorded independent of optical pyrometer 140, a second temperature measurement of blackbody target is performed using optical pyrometer 140. Optical pyrometer 140 measures the second temperature of blackbody target 170 using light rays emitted by blackbody target 170 which pass through optical port 180 and reflect off of mirror 200. After both temperature values are obtained, the first temperature value is compared with the second temperature value. The temperature values may be compared either manually or using computer means. If the second temperature value does not agree with the first, tuner 150 may be used to bring the second temperature into coincidence with the first. The result is a calibrated optical pyrometer, which can be retrained on the RTA process in chamber 100 by moving mirror 200 out of the way.

What is claimed is:

1. A device comprising:
    a heating chamber;
    an optical pyrometer, wherein said optical pyrometer is positioned to receive light rays through an optical port in said first heating chamber from a first optical source residing inside said heating chamber;
    a second optical source external to said heating chamber, wherein the external location of said second optical source relative to said heating chamber allows for calibration of said optical pyrometer without modification of said heating chamber or said first optical source residing inside said heating chamber;
    a mirror located between said optical pyrometer and said heating chamber, wherein said mirror is situated to permit the optical pyrometer to receive light rays from said second optical source without altering the position of either said optical pyrometer or said heating chamber.

2. The device recited in claim 1, wherein said heating chamber is an RTA chamber.

3. The device recited in claim 1, wherein said optical pyrometer is mounted to said heating chamber.

4. The device recited in claim 1, wherein said first optical source comprises a first wafer residing in said heating chamber and said second optical source comprises a blackbody reference.

5. The device recited in claim 4, wherein said blackbody reference comprises at least one blackbody chamber housing a blackbody target.

6. The device recited in claim 5, wherein said black body chamber comprises an oven with an optical port and wherein said blackbody target comprises a second wafer.

7. A method for calibrating an optical pyrometer comprising:
    providing a heating chamber housing a first optical source;
    positioning said optical pyrometer to receive light rays from said first optical source through an optical port in said heating chamber, wherein said optical pyrometer uses the light rays from said first optical source to measure the temperature of said first optical source;
    situating a mirror between said heating chamber and said optical pyrometer;
    adjusting said mirror to receive light rays from a second optical source, wherein said second optical source is located external to said heating chamber and wherein the external location of said second optical source relative to said heating chamber allows for calibration of said optical pyrometer without modification of said heating chamber or said first optical source residing inside said heating chamber;

raising said second optical source to a first temperature;

measuring and recording a second temperature of said second optical source with said optical pyrometer by using light rays from said second optical source;

tuning said optical pyrometer to bring said second temperature into coincidence with said first temperature.

8. The method as recited in claim 7, wherein said first heating chamber is an RTA chamber.

9. The method as recited in claim 7, wherein said optical pyrometer is mounted to said first heating chamber.

10. The method as recited in claim 7, wherein the accuracy of said first temperature of said second optical source is maintained using a thermocouple attached to said second optical source.

11. The method recited in claim 7, wherein said first optical source comprises a first wafer residing in said first heating chamber and said second optical source comprises a blackbody reference.

12. The method as recited in claim 11, wherein said first heating chamber is maintained at an operating temperature and said blackbody reference is calibrated at or near said operating temperature.

13. The method recited in claim 11, wherein said blackbody reference comprises at least one blackbody chamber housing a blackbody target.

14. The method as recited in claim 13, wherein said black body chamber comprises an oven with an optical port and wherein said blackbody target comprises a second wafer.

15. The blackbody chamber recited in claim 14, wherein the composition of the optical port in said oven is identical to the composition of the optical port in said heating chamber.

16. A method for calibrating an optical pyrometer comprising:

processing a first wafer in a heating chamber;

positioning said optical pyrometer to receive light rays from said first wafer through an optical port in said first heating chamber, wherein said optical pyrometer uses the light rays from said first wafer to measure the temperature of said first said wafer;

situating a mirror between said optical pyrometer and said heating chamber;

adjusting said mirror to receive light rays from a second wafer residing in a blackbody chamber external to said heating chamber, wherein the external location of said blackbody chamber relative to said heating chamber allows for calibration of said optical pyrometer without effecting the processing of said first wafer in said heating chamber;

measuring and recording a first temperature of a second wafer housed in said blackbody chamber using said optical pyrometer by aiming said optical pyrometer through an optical port in said black body chamber;

measuring and recording a second temperature of said second wafer using a thermocouple attached to said second wafer;

comparing said first and second temperatures of said second wafer;

causing the first and second temperatures of said second wafer to coincide.

17. The method as recited in claim 16, wherein said heating chamber is an RTA chamber.

18. The method as recited in claim 16, wherein said optical pyrometer is mounted to said heating chamber.

19. The method as recited in claim 16, wherein said black body chamber is maintained at approximately the same temperature as said heating chamber.

20. The method as recited in claim 16, wherein said black body chamber comprises an oven with an optical port, wherein the composition of the optical port in said oven is identical to the composition of the optical port in said heating chamber.

* * * * *